United States Patent
Jiang et al.

(10) Patent No.: US 11,558,617 B2
(45) Date of Patent: Jan. 17, 2023

(54) END-TO-END DEPENDENT QUANTIZATION WITH DEEP REINFORCEMENT LEARNING

(71) Applicant: TENCENT AMERICA LLC, Palo Alto, CA (US)

(72) Inventors: Wei Jiang, Palo Alto, CA (US); Wei Wang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/488,438

(22) Filed: Sep. 29, 2021

(65) Prior Publication Data
US 2022/0174281 A1 Jun. 2, 2022

Related U.S. Application Data

(60) Provisional application No. 63/119,446, filed on Nov. 30, 2020.

(51) Int. Cl.
*H04N 19/124* (2014.01)
*G06N 3/08* (2006.01)
*G06N 3/04* (2006.01)

(52) U.S. Cl.
CPC ......... *H04N 19/124* (2014.11); *G06N 3/0454* (2013.01); *G06N 3/08* (2013.01)

(58) Field of Classification Search
CPC ....... H04N 19/124; G06N 3/0454; G06N 3/08
USPC .................................................. 375/240.03
See application file for complete search history.

(56) References Cited

U.S. PATENT DOCUMENTS

| | | | |
|---|---|---|---|
| 2003/0035589 A1* | 2/2003 | Kim | G06T 9/005 382/239 |
| 2019/0354842 A1 | 11/2019 | Louizos et al. | |
| 2020/0366940 A1 | 11/2020 | Lim et al. | |
| 2022/0114479 A1* | 4/2022 | Zhao | G06N 7/005 |
| 2022/0156982 A1* | 5/2022 | Idelbayev | G06N 3/0454 |
| 2022/0312023 A1* | 9/2022 | Nishi | H04N 19/70 |

FOREIGN PATENT DOCUMENTS

WO 2020/188273 A1 9/2020

OTHER PUBLICATIONS

International Search Report dated Jan. 11, 2022 in International Application No. PCT/US2021/052806.
Written Opinion of the International Searching Authority dated Jan. 11, 2022 in International Application No. PCT/US2021/052806.

* cited by examiner

*Primary Examiner* — Dominic D Saltarelli
(74) *Attorney, Agent, or Firm* — Sughrue Mion, PLLC

(57) ABSTRACT

There is included a method and apparatus comprising computer code configured to cause a processor or processors to perform obtaining an input stream of video data, computing a key based on a floating number in the input stream, predicting a current dependent quantization (DQ) state based on a state predictor and a number of previous keys and a number of previous DQ states, reconstructing the floating number based on the key and the current DQ state, and coding the video based on the reconstructed floating number.

20 Claims, 22 Drawing Sheets

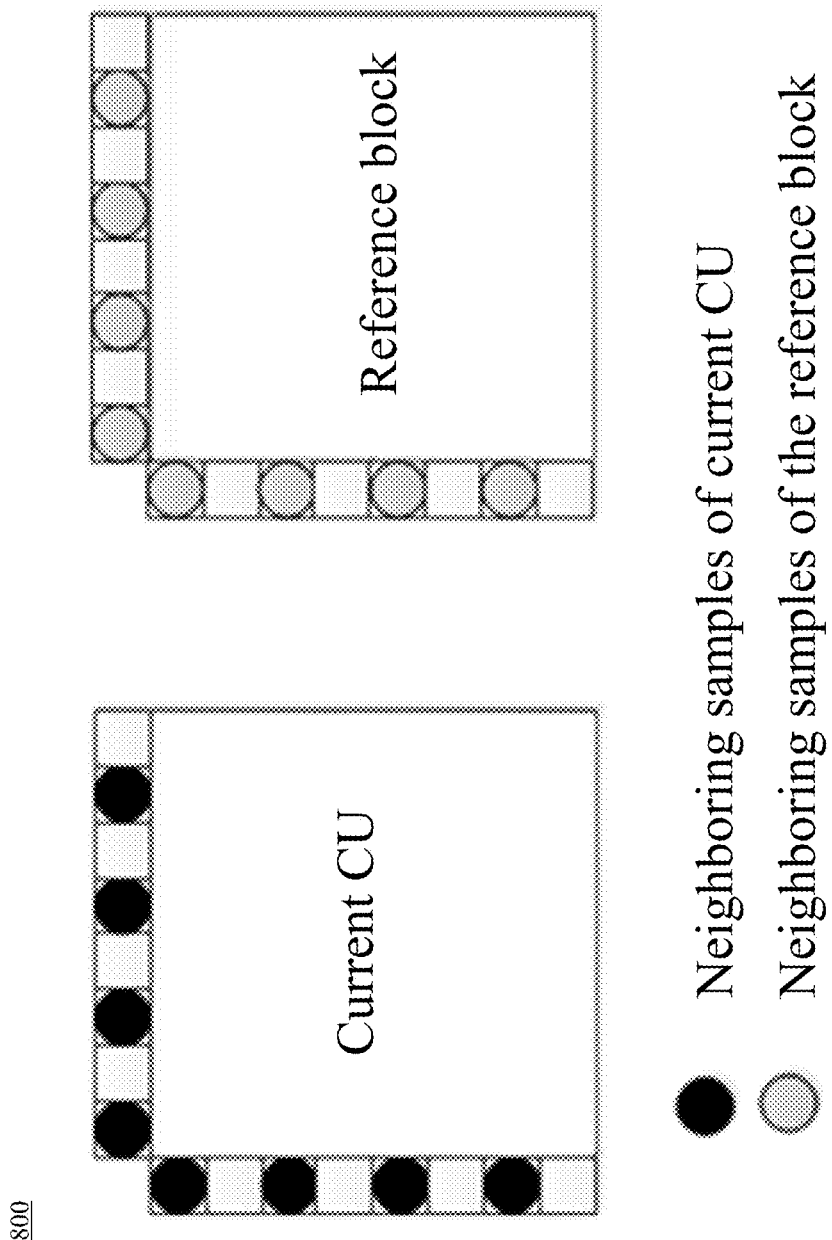

901

900

END-TO-END DEPENDENT QUANTIZATION WITH DEEP REINFORCEMENT LEARNING

CROSS REFERENCE TO RELATED APPLICATION

The present application claims priority to provisional application U.S. 63/119,446 filed on Nov. 30, 2020 which is hereby expressly incorporated by reference, in its entirety, into the present application.

BACKGROUND

1. Field

The present disclosure relates to learning-based End-to-End (E2E) Dependent Quantization (DQ) using Deep Reinforcement Learning (DRL), supporting an arbitrary number of DQ states, and where transitions among different DQ states may be automatically determined based on the Deep Q-Network (DQN) algorithm.

2. Description of Related Art

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

Quantization is a core process in image and video compression standards and production, which is also one main source of compression quality loss. Improving quantization efficiency can bring large performance gain in all image and video compression tasks.

SUMMARY

According to exemplary embodiments, there is included a method and apparatus comprising memory configured to store computer program code and a processor or processors configured to access the computer program code and operate as instructed by the computer program code. The computer program code includes obtaining code configured to cause the at least one processor to obtain an input stream of video data, computing code configured to cause the at least one processor to compute a key based on a floating number in the input stream, predicting code configured to cause the at least one processor to predict a current dependent quantization (DQ) state based on a number of previous keys and a number of previous DQ states, reconstructing code configured to cause the at least one processor to reconstruct the floating number based on the key and the current DQ state, and coding code configured to cause the at least one processor to code the video based on the reconstructed floating number.

According to exemplary embodiments, computing the key and reconstructing the floating number comprises implementing one or more deep neural networks (DNN).

According to exemplary embodiment, the state predictor comprises an action-value mapping function between an action and an output Q-value associated with the action.

According to exemplary embodiment, the computing code is further configured to cause the at least one processor to compute a plurality of keys, including the key, based on a plurality of floating numbers, including the floating number, in the input stream, and the reconstructing code is further configured to cause the at least one processor to reconstruct the plurality of floating numbers based on the plurality of keys and at least the current DQ state.

According to exemplary embodiment, the action corresponds to at least one of the DQ states.

According to exemplary embodiment, wherein the state predictor further comprises respective correspondences between ones of a plurality of actions, including the action, and ones of the DQ states, including the at least one of the DQ states.

According to exemplary embodiment, predicting the current DQ state comprises implementing an action-value mapping function between an action and an output Q-value associated with the action the previous keys and the previous DQ states.

According to exemplary embodiment, the state predictor comprises an action-value mapping function between an action and an output Q-value associated with the action, and the output Q-value represents a measurement of a target quantization performance associated with a sequence of actions, including the action.

According to exemplary embodiment, predicting the current DQ state based on the state predictor comprises computing Q-values, including the output Q-value, for each of the actions.

According to exemplary embodiment, the output Q-value is selected from among the computed Q-values.

BRIEF DESCRIPTION OF THE DRAWINGS

Further features, nature, and various advantages of the disclosed subject matter will be more apparent from the following detailed description and the accompanying drawings in which:

FIG. 8 is a simplified illustration of a diagram in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
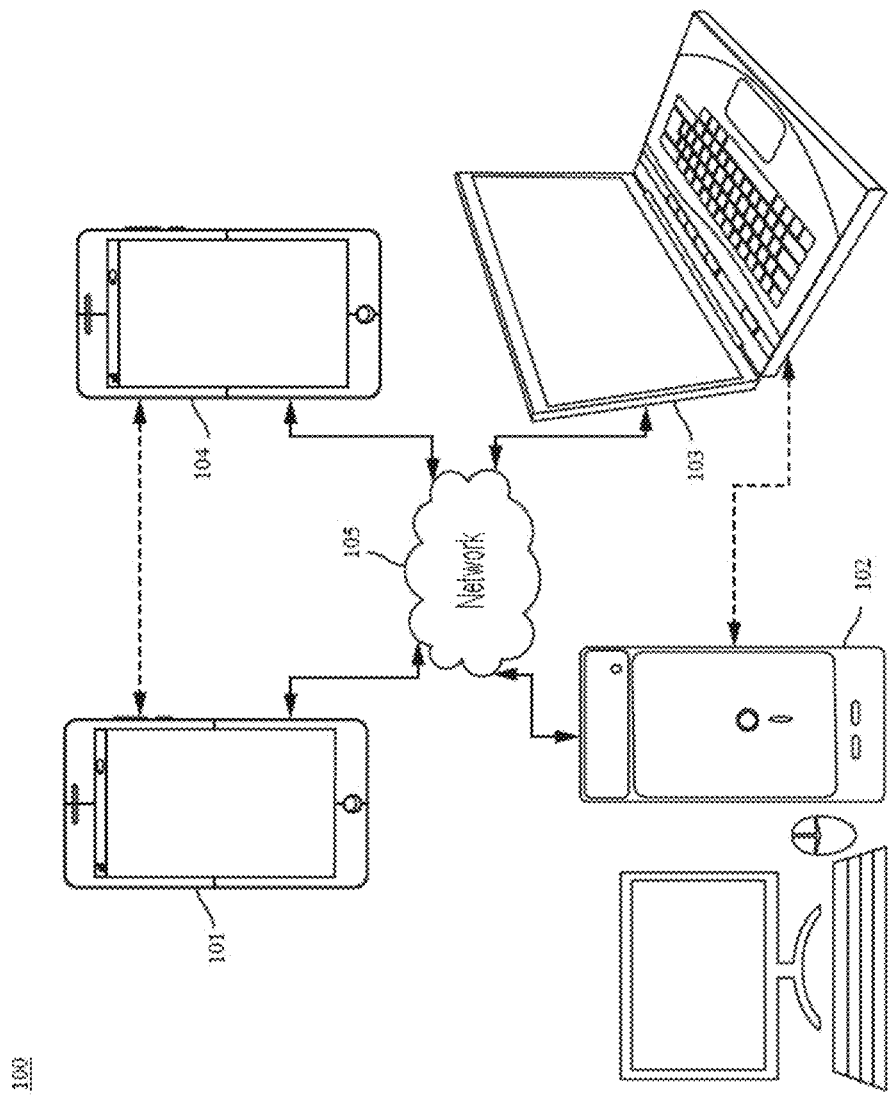
FIG. 1 is a simplified illustration of a schematic diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
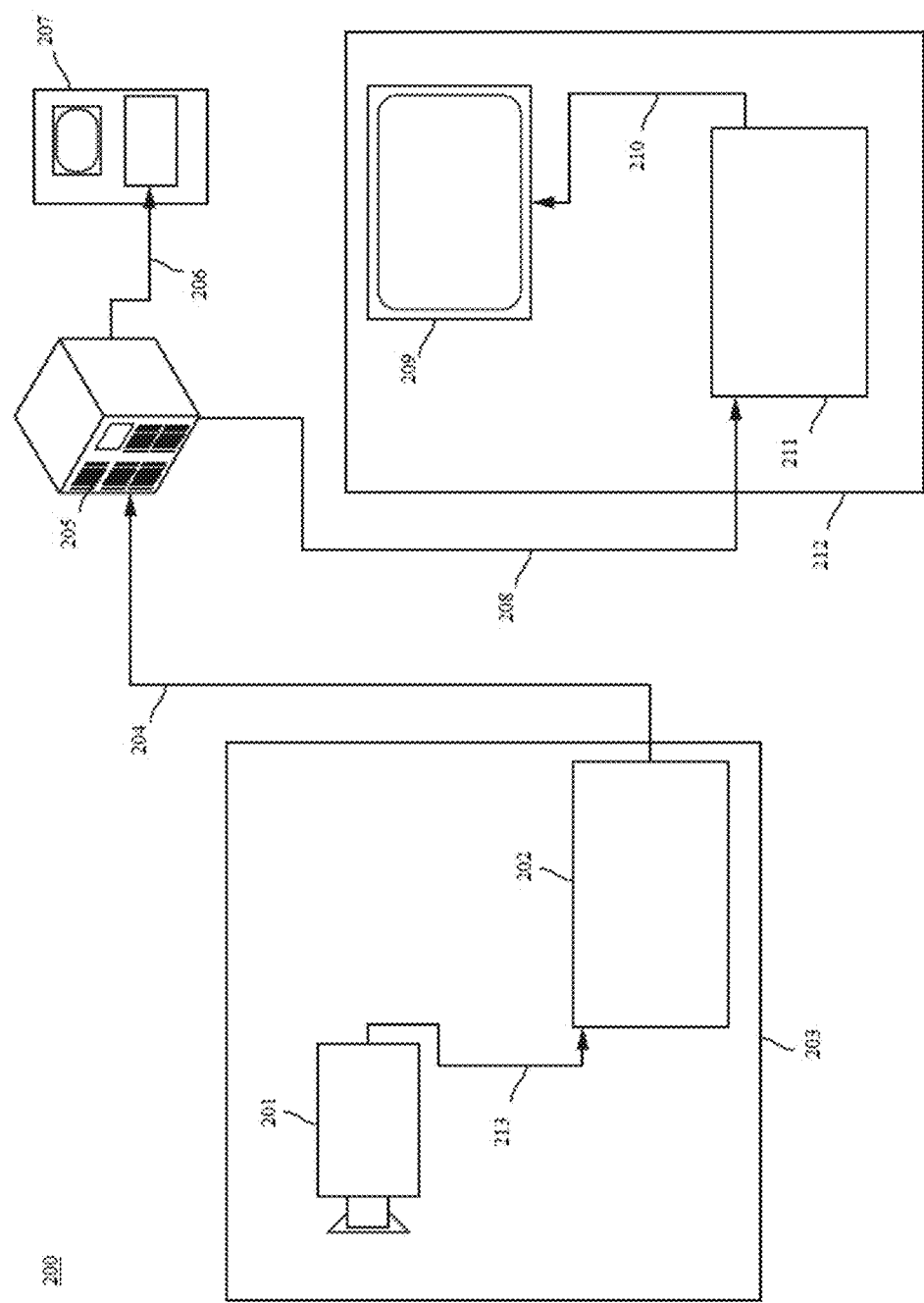
FIG. 2 is a simplified illustration of a schematic diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
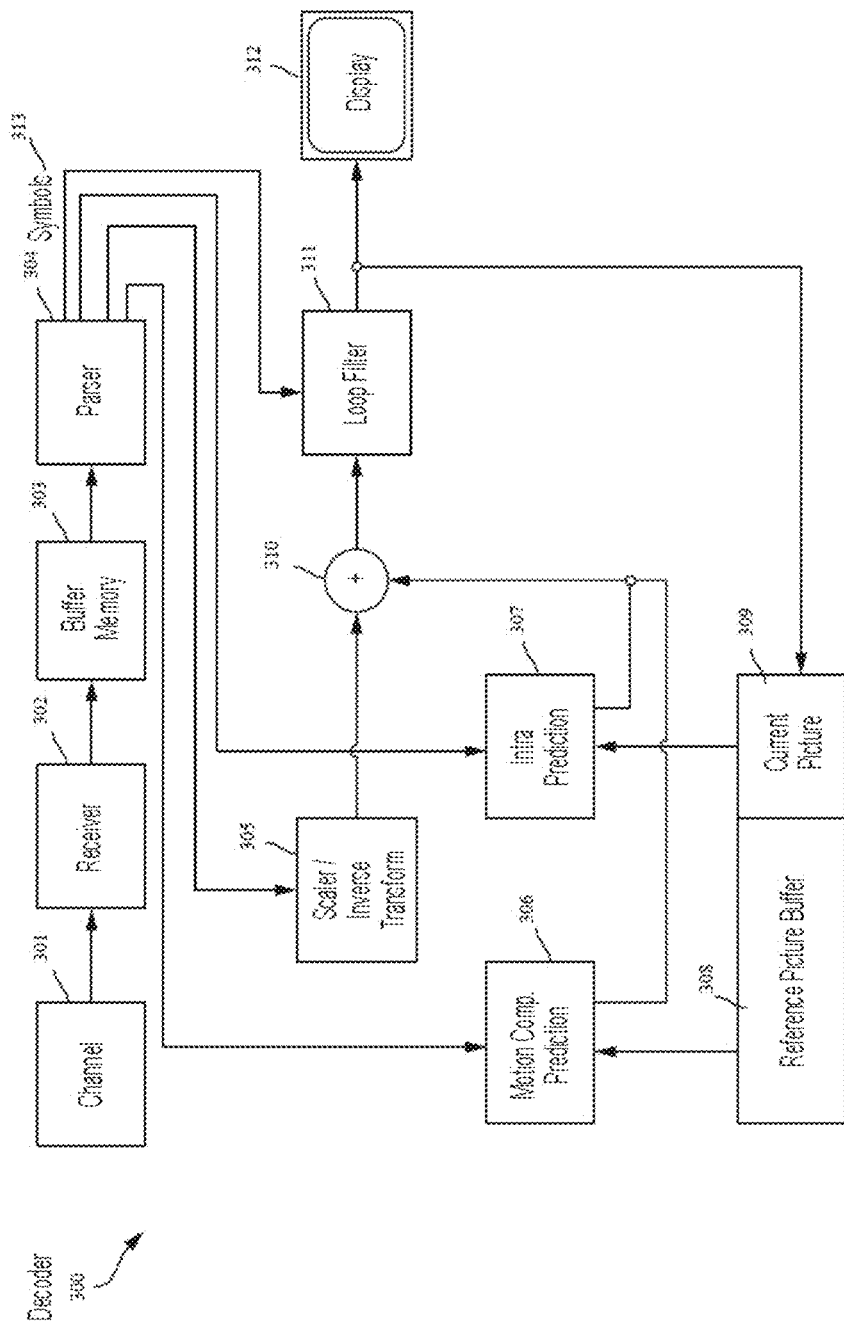
FIG. 3 is a simplified illustration of a schematic diagram in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
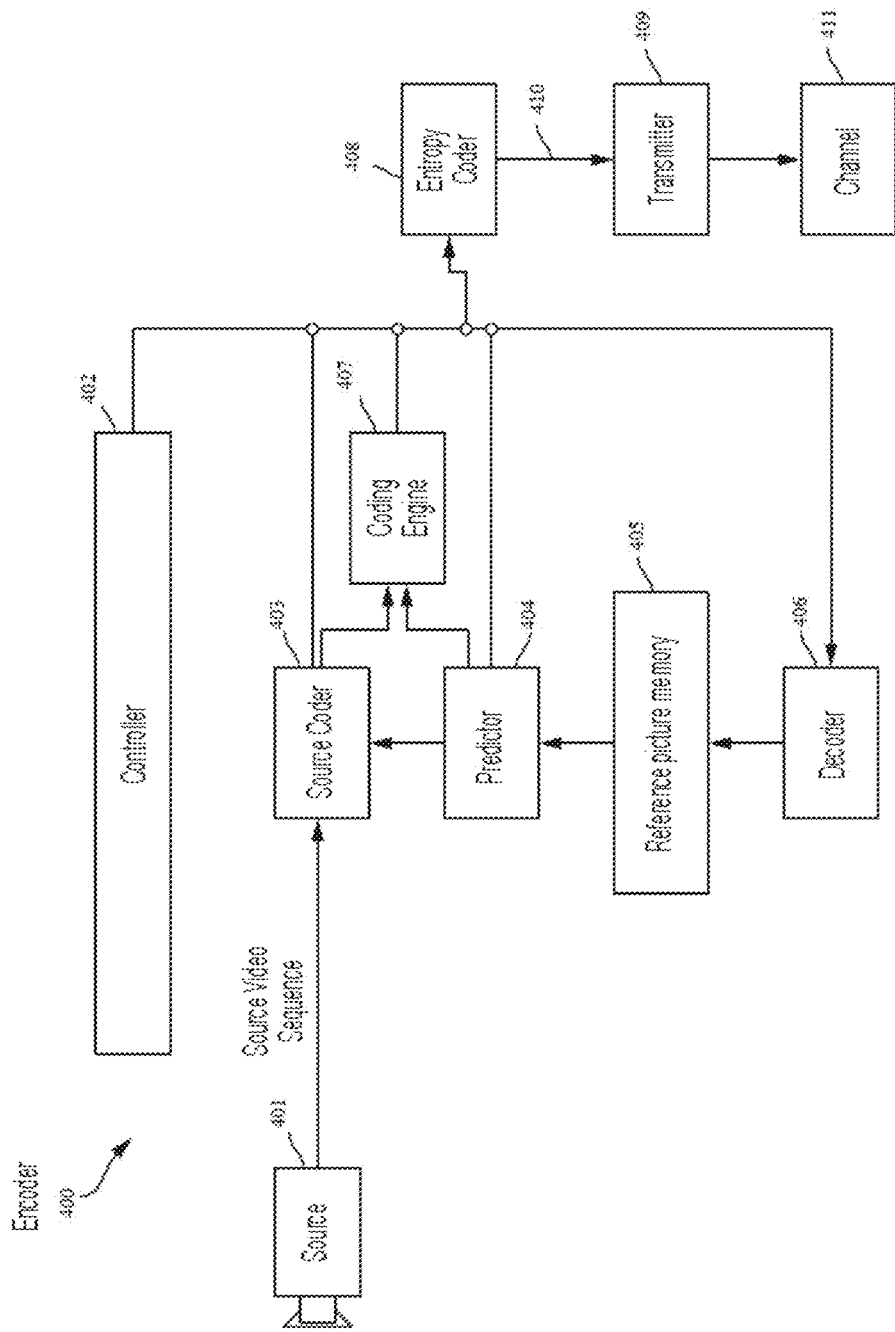
FIG. 4 is a simplified illustration of a schematic diagram in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
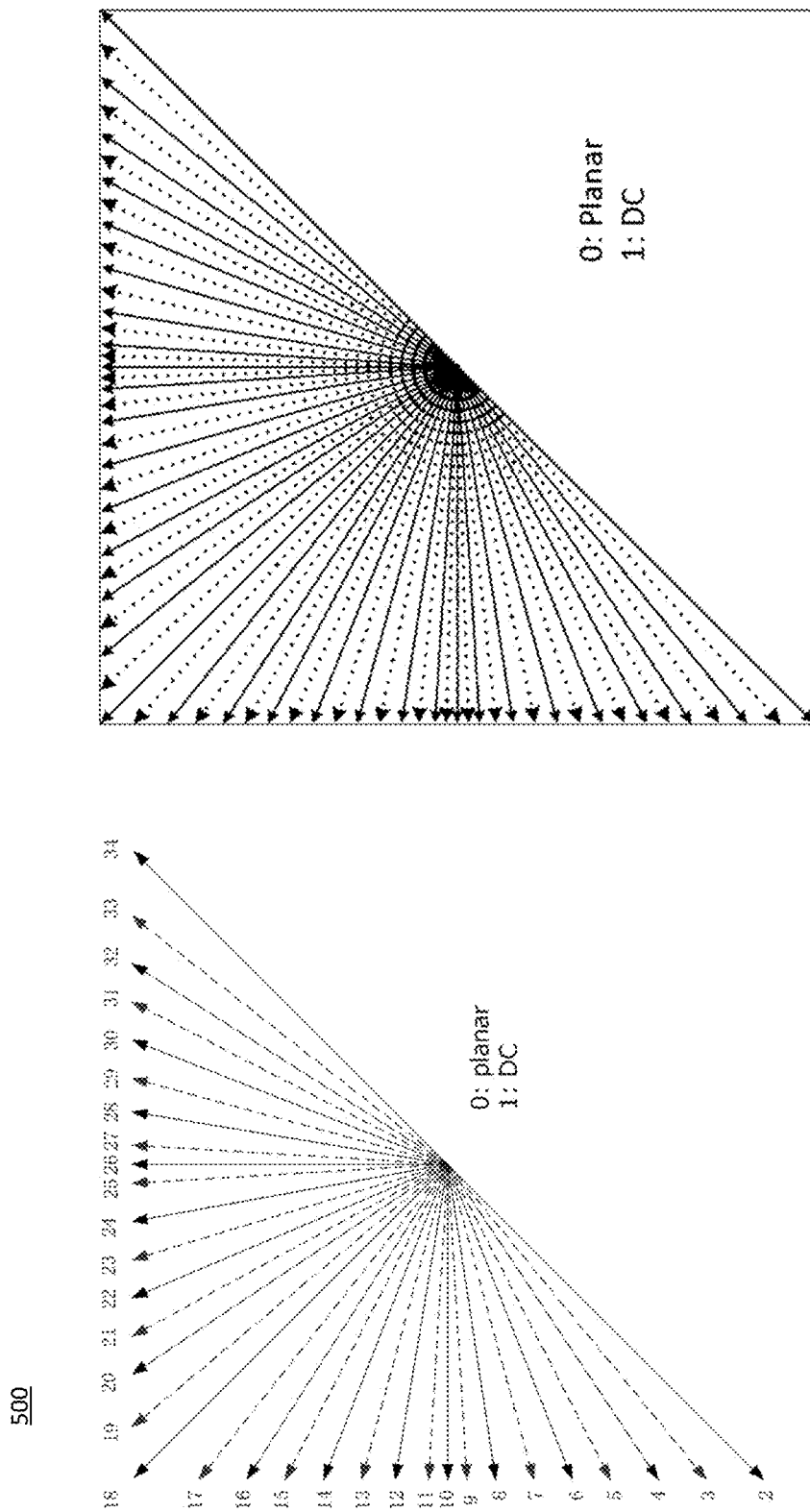
FIG. 5 is a simplified illustration of a diagram in accordance with embodiments.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (b), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
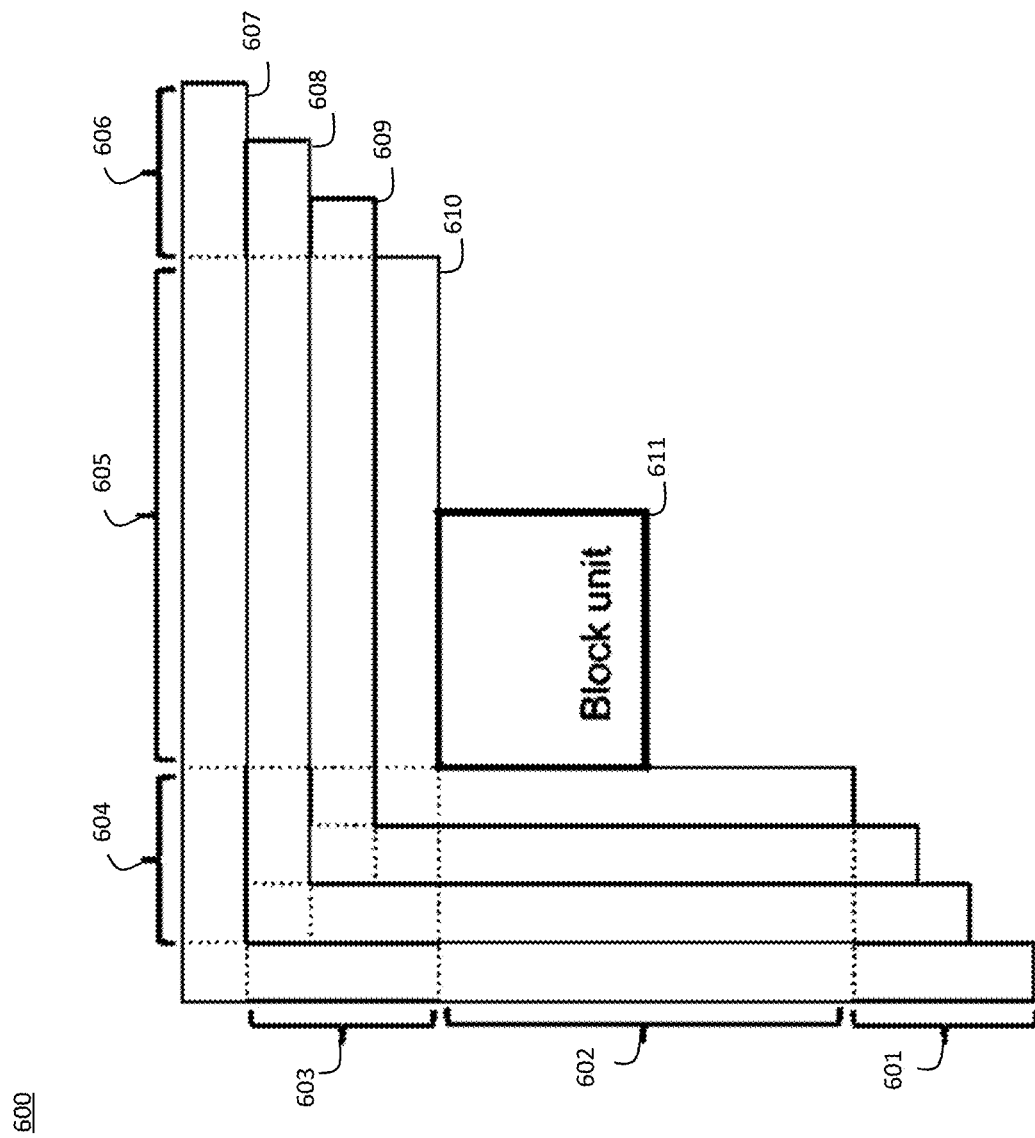
FIG. 6 is a simplified illustration of a diagram in accordance with embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$pred[x][y] = (wL*R_{-1,y} + wT*R_{x,-1} + wTL*R_{-1,-1} + \qquad \text{(Eq. 2-1)}$$
$$(64 - wL - wT - wTL)*pred[x][y] + 32) >> 6$$

where $R_{x,-1}, R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT = 32 >> ((y << 1) >> \text{shift}) \qquad \text{(Eq. 2-2)}$$
$$wL = 32 >> ((x << 1) >> \text{shift}) \qquad \text{(Eq. 2-3)}$$
$$wTL = -(wL >> 4) - (wT >> 4) \qquad \text{(Eq. 2-4)}$$
$$\text{shift} = (\log2(\text{width}) + \log2(\text{height}) + 2) >> 2. \qquad \text{(Eq. 2-5)}$$

Figure 7:
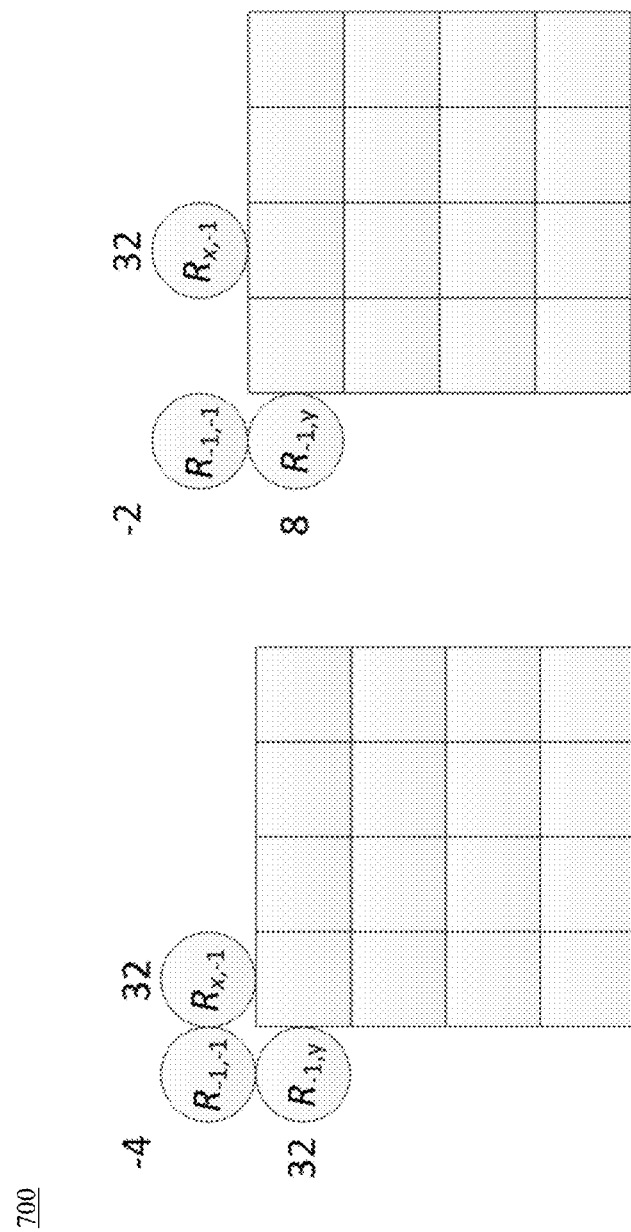
FIG. 7 is a simplified illustration of a diagram in accordance with embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
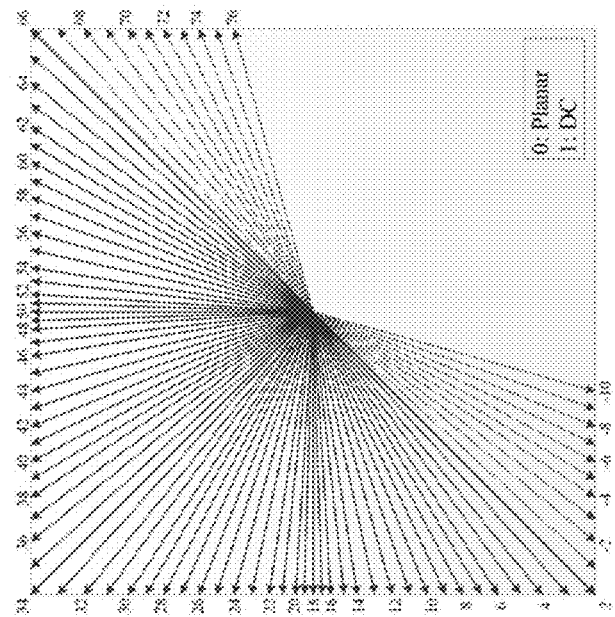
FIG. 9B is a simplified illustration of a diagram in accordance with embodiments.
Figure 9A:
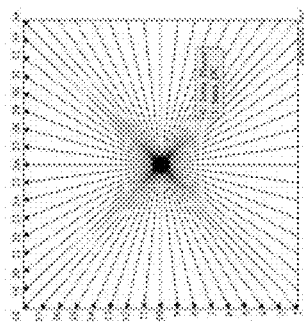
FIG. 9A is a simplified illustration of a diagram in accordance with embodiments.

FIG. 9A illustrates intra prediction modes 900 used in HEVC. In HEVC, there are total 35 intra prediction modes, among which mode 10 is horizontal mode, and mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$pred(x, y) = (wL \times R-1, y + wT \times Rx, -1 + wTL \times R-1,$$
$$-1 + (64 - wL - wT - wTL) \times pred((x, y) + 32) >> 6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT = 32 >> ((y << 1) >> nScale),$$
$$wL = 32 >> ((x << 1) >> nScale),$$
$$wTL = (wL >> 4) + (wT >> 4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Herein the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. According to embodiments, the term block may be interpreted as a prediction block, a coding block, or a coding unit, i.e. CU.

Figure 10:
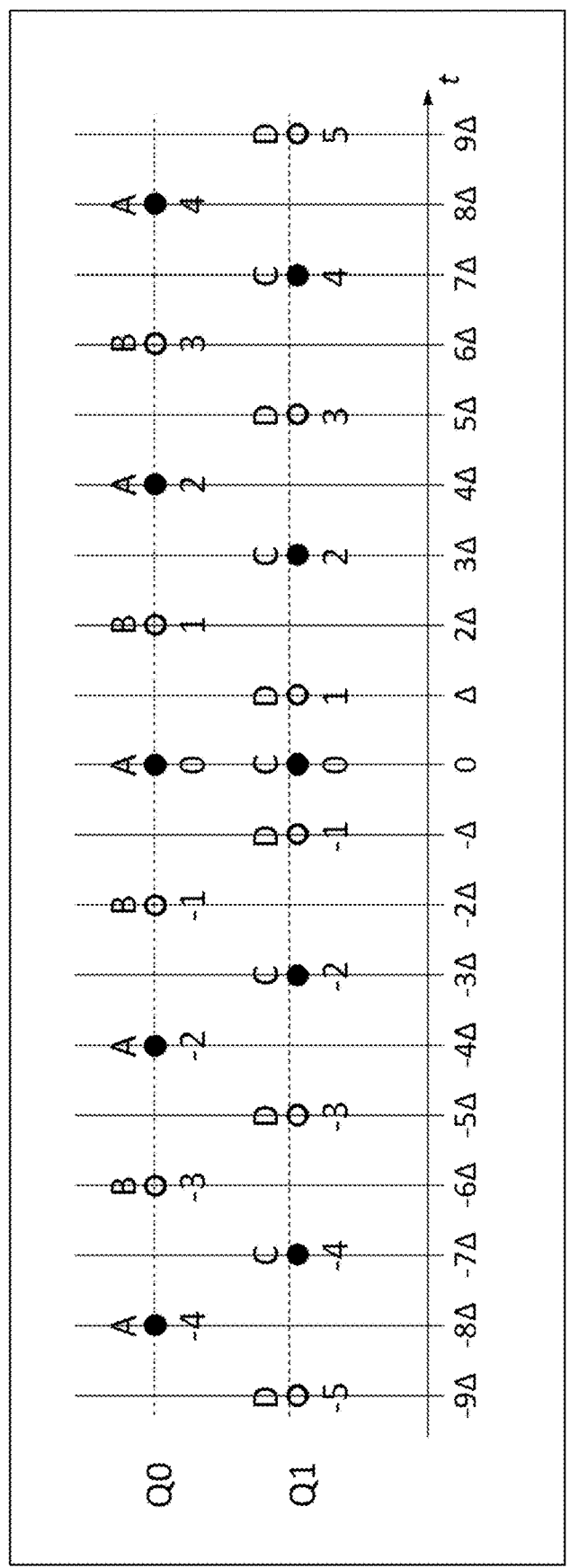
FIG. 10 is a simplified illustration of a diagram in accordance with embodiments.

Dependent Quantization (DQ) or trellis-coded quantization comprises of two quantizers $Q_0$ and $Q_1$ and a procedure for switching between them. FIG. 10 gives an example illustration diagram 1000 of a DQ mechanism. On a decoder side, such as decoder 300 in FIG. 3, a reconstructed number x' may be determined by an integer key k multiplying a quantization step size A for either $Q_0$ or $Q_1$. The switching between $Q_0$ and $Q_1$ can be represented by a state machine with $M=2^K$ DQ states, $K≥2$ (hence $M≥4$), where each DQ state is associated with one of the quantizers $Q_0$ or $Q_1$. The current DQ state is uniquely determined by the previous DQ state and the value of the current quantization key. For encoding an input stream $x_1, x_2, \ldots$ the potential transitions between $Q_0$ and $Q_1$ can be illustrated by a trellis with $2^K$ DQ states. Thus, selecting the optimal sequence of quantization keys $k_1, k_2, \ldots$ is equivalent to finding the trellis path with the minimum Rate-Distortion (R-D) cost, and the problem can be solved by the Viterbi algorithm.

However, hand designing such needed state machine, even if empirically, cannot be practically implemented even if such hand-designed state machine may be needed in the VVC standard. For example, major limitations of such DQ methods lies in at least three folds. First, only two quantizers are used, and bit consumption may be reduced in encoding the numbers according to exemplary embodiments herein which, for example, increase a number of quantizers. Second, hand-designing a state-machine is not optimal and too expensive to include a large number of DQ states. Increasing the number of quantizers requires increasing the number of DQ states, which can improve the quantization efficiency, but will result in a state machine too complicated to be hand-designed. Finally, key generation and number reconstruction heuristically designed, even if manually, may be neither optimal nor practical. Searching for other better methods requires domain expertise and can be too expensive to be manually designed.

Figure 11:
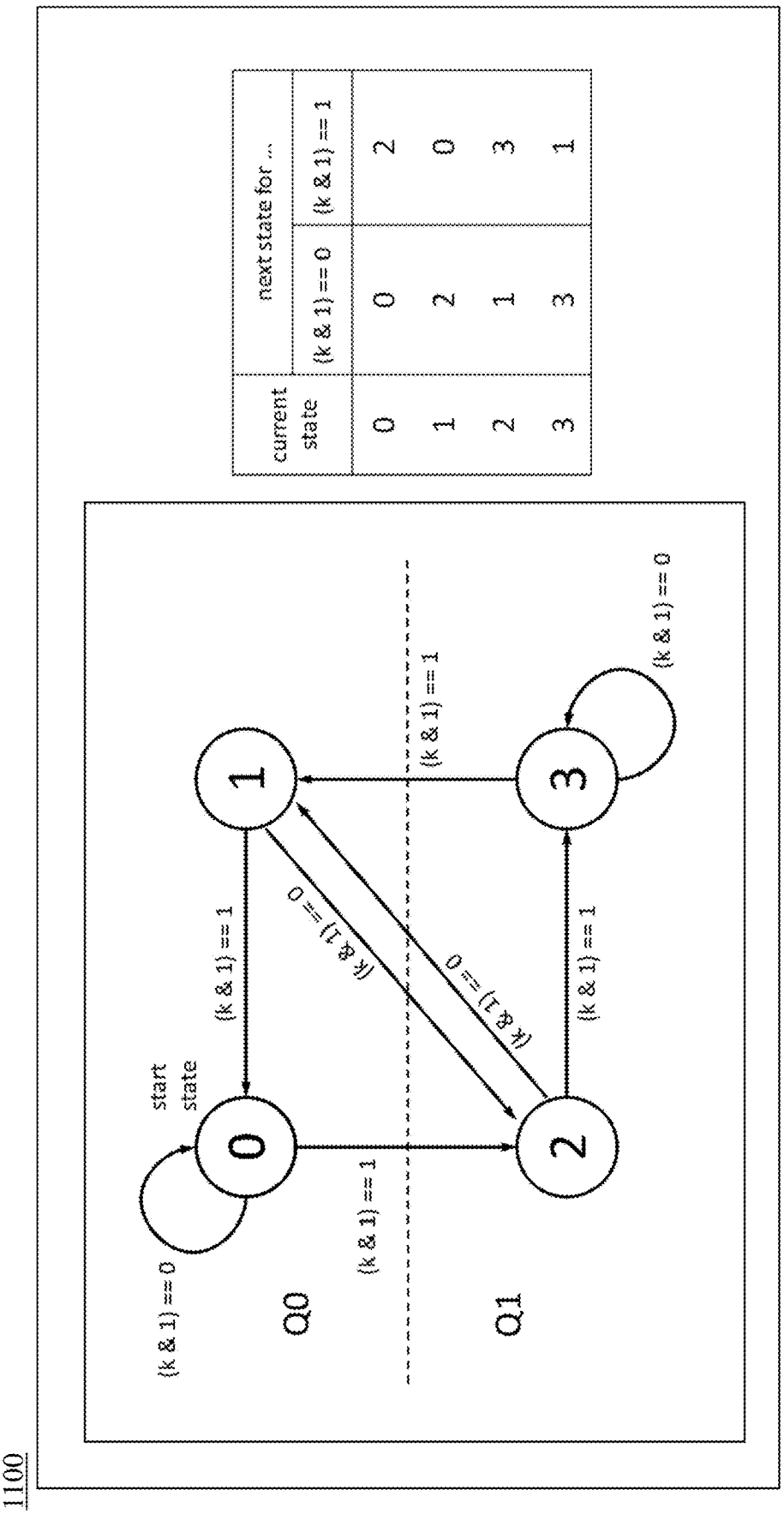
FIG. 11 is a simplified illustration of a diagram in accordance with embodiments.

As in the diagram 1000 of FIG. 10, there is shown an example of using $Q_0$ and $Q_1$ in a DQ design where a reconstructed number may be represented by an integer key multiplying the quantization step size A, and labels above the circles indicate associated states, and labels below the circles show the associated quantization keys. See the exemplary diagram 1100 of FIG. 11 as an example of a state machine in VVC with four states. As described below, exemplary embodiments include a learning-based E2E DQ mechanism based on Deep Reinforcement Learning (RL), and, for example, quantizes and reconstructs an input stream in an E2E fashion while supporting an arbitrary number of DQ states, and learning the transition among different DQ states automatically through the DQN algorithm.

Figure 12:
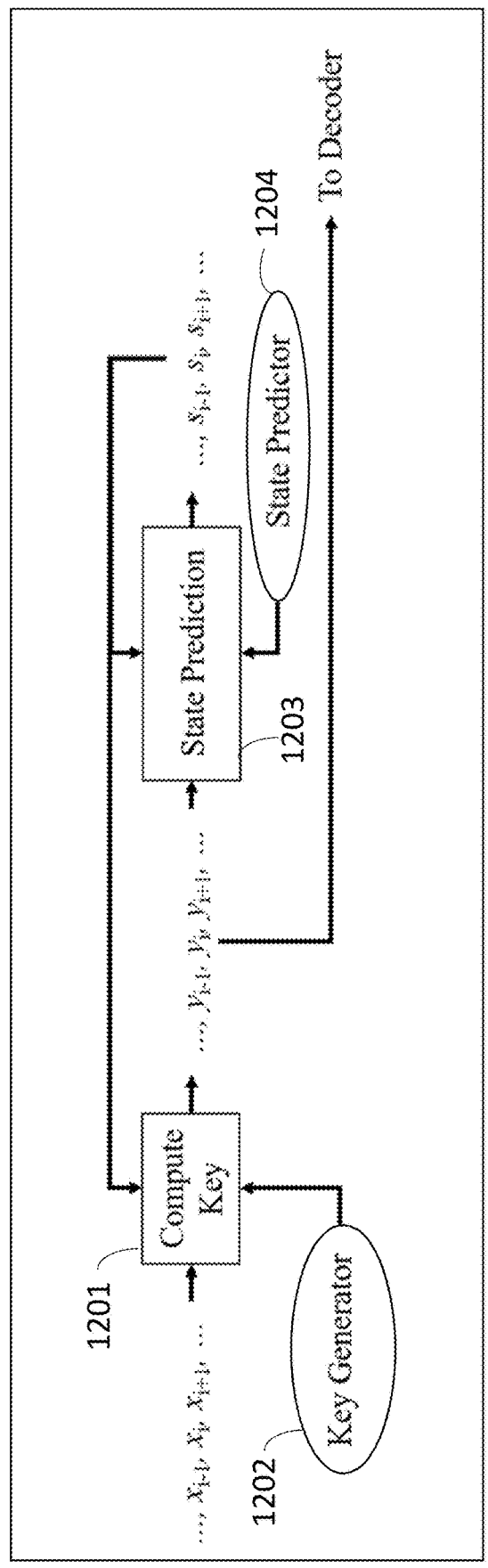
FIG. 12 a simplified illustration of a diagram in accordance with embodiments.
Figure 13:
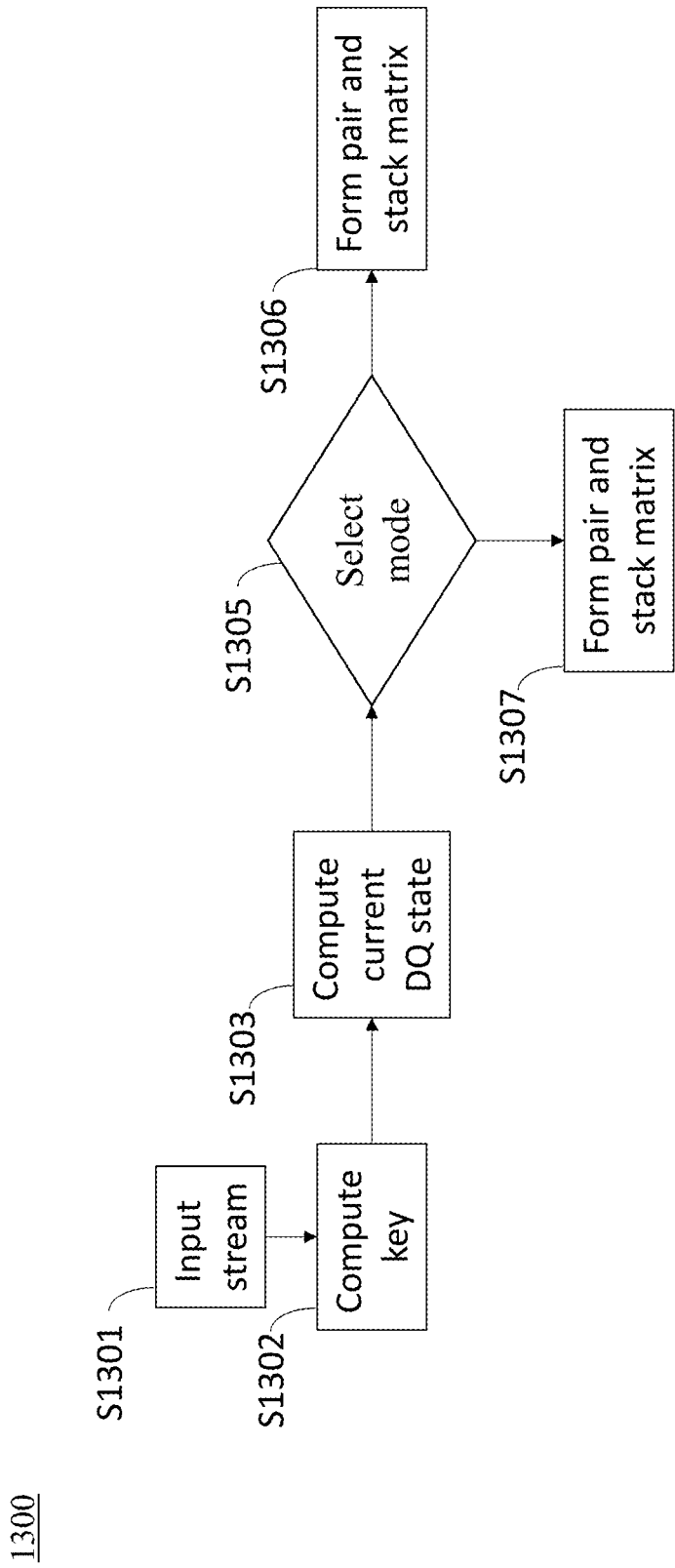
FIG. 13 a simplified illustration of a flowchart in accordance with embodiments.
Figure 14:
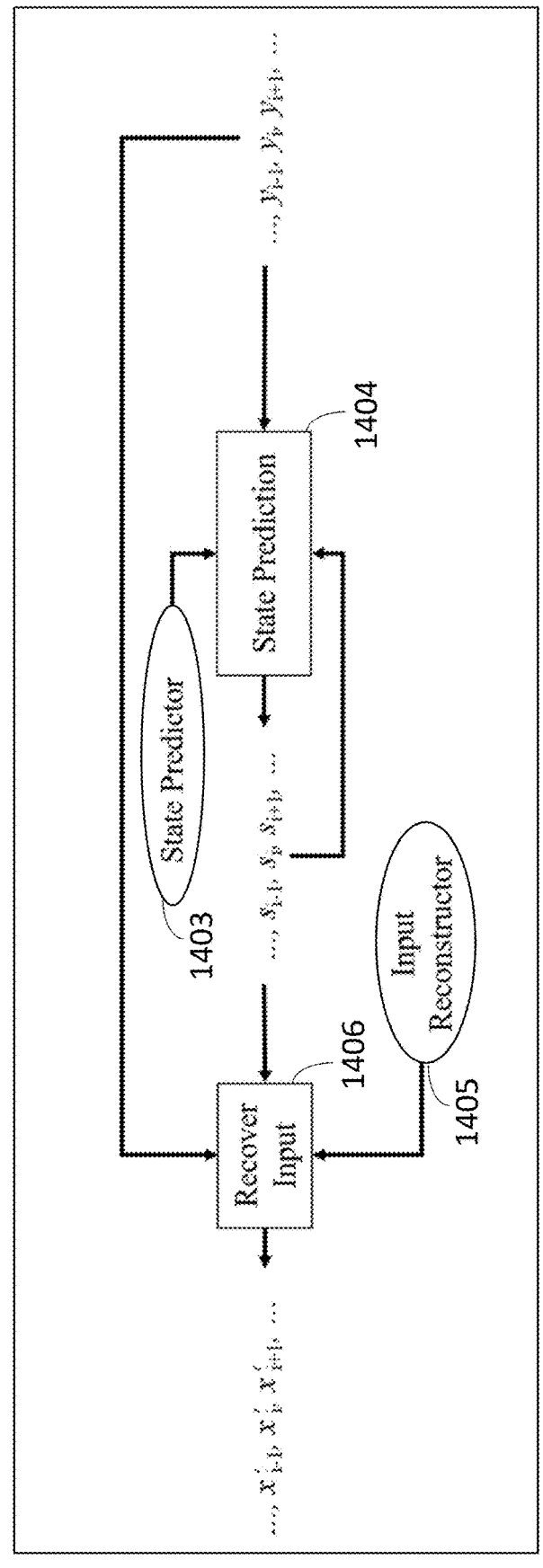
FIG. 14 a simplified illustration of a diagram in accordance with embodiments.
Figure 15:
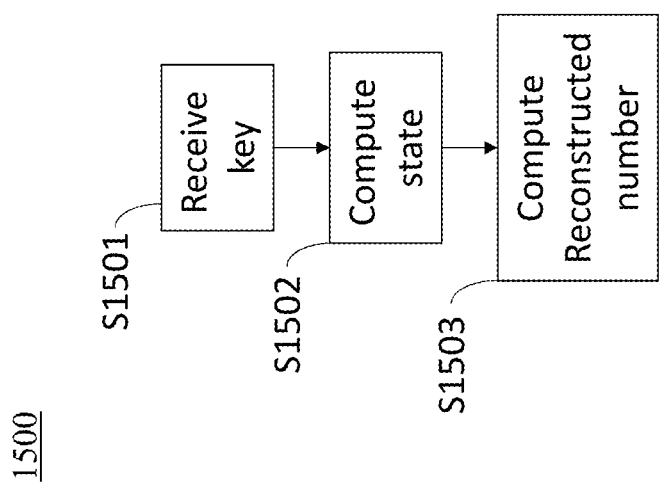
FIG. 15 a simplified illustration of a flowchart in accordance with embodiments.

The diagram 1200 in FIG. 12, and its associated flowchart 1300 in FIG. 13, and the diagram 1400 in FIG. 14, and its associated flowchart 1400, illustrate exemplary embodiments of a workflow of a Encoder and a Decoder of a test stage, respectively. For example, at S1301, given an input stream $X=x_1, x_2, \ldots$, where each $x_1$ is a floating number, for each number $x_i$, a Compute Key module 1201 computes, at S1302, a key $y_i$ based on $x_i$ by using a Key Generator 1202. Then, at S1303, a State Prediction module 1203 computes a current DQ state $s_i$ by using a State Predictor 12-4. The inputs of the State Prediction module 1203 include a number of m previous keys $y_{i-(m-1)}, \ldots, y_i$ (m≥1) and a number of n previous DQ states $s_{i-n}, \ldots, s_{i-1}$ (n≥1), wjere m and n can be the same, or different. A selection between modes may be made at S1305 based on predetermined criteria or setting, and for example, in one preferred embodiment, at S1306, having n=1 and m≥1, a state $s_{i-1}$ is attached to each of the m keys to form a pair, and the m pairs are stacked together to form an input matrix of size (m, 2). In contrast, at S1307, in another preferred embodiment, m=n, and each key and the corresponding state form a pair $(y_i, s_{i-1})$, and the m pairs are stacked together to form an input matrix of size (m, 2), such that the system sends the key $y_i$ to the Decoder, such as in diagram 1400, and goes on to process the next number $x_{i+1}$.

On the Decoder side, such as in diagram 1400, after receiving the key $y_i$ at S1501, the State Prediction module 1404 computes the current DQ state $s_i$ by using the State Predictor 1403 in the same way as the Encoder, as in diagram 1200, based on the input m previous keys $y_{i-(m-1)}, \ldots, y_i$ and n previous DQ states $s_{i-n}, \ldots, s_{i-1}$. Then, at S1503, a Recover Input module 1406 computes the reconstructed number $x_i$ based on key $y_i$ and DQ state $s_i$, by using an Input Reconstructor 1405. According to exemplary embodiments, the State Predictor, any one or both of 1204 and 1403, is an action-value mapping function $f(a_{ij}, v_i|y_{i-(m-1)}, \ldots, y_i, s_{i-n}, \ldots, s_{i-1})$ between an action $a_{ij}$ and an output Q-value $v_{ij}$ associated with the action, $j=1, \ldots, J$ (assuming we have J possible actions in total), given the input previous keys $y_{i-(m-1)}, \ldots, y_i$ and previous DQ states $s_{i-n}, \ldots, s_{i-1}$. Here each action $a_{ij}$ corresponds to a DQ state that the system can take and therefore we have J DQ states in total. For the i-th number $x_i$, the State Predictor computes the Q-values $v_{ij}$ of all possible actions $a_{ij}$, and selects the optimal action $a_i^*$ with the optimal Q-value $v_i^*$. The DQ states corresponding to the optimal action $a_i^*$ is the state $s_i$ the system selects. The Q-value is designed to measure the target quantization performance associated with the sequence of actions. So, selecting the optimal action gives the optimal target quantization performance. Further, such Deep Q-learning mechanism, specifically the DQN algorithm, which is an off-policy DRL method, is used as the preferred training method according to exemplary embodiments. For example, DQN finds an optimal action selection policy for any given finite Markov Decision Process, which learns the action-value mapping function to assign a reward Q-value to an action. A policy is a rule that the system follows in selecting actions. Given a current state, the learning agent may choose from a set of candidate actions, which result in different reward values. By experiencing various states and trying out various actions being at various states, the learning agent learns overtime to optimize the rewards so that it can behave optimally in the future at any given state it is in.

According to exemplary embodiments, the State Predictor, such as any one or more of State Predictors 1204, 1404, and the below State Predictors 1604, 1823, and 2004 for example, is a DNN, which acts as a function approximator to estimate the action-value mapping function $f(a_{ij}, v_i||y_{i-(m-1)}, \ldots, y_i, s_{i-n}, \ldots, s_{i-1})$. Such State Predictor DNN typically comprises of a set of convolutional layers followed by one or multiple fully connected layers, and, the Key Generator, such as any one or more of Key Generator 1202 and the below Key Generators 1602 and 2002, and the Input Reconstructor, such as any one or more of Input Reconstructor 1405, and the below described Input Reconstructors 1607, and 2022, are both DNNs (e.g., a few convolutional layers followed by fully connected layers). Such State Predictor, the Key Generator and the Input Reconstructor may be jointly trained in an end-to-end fashion according to exemplary embodiments.

Figure 16:
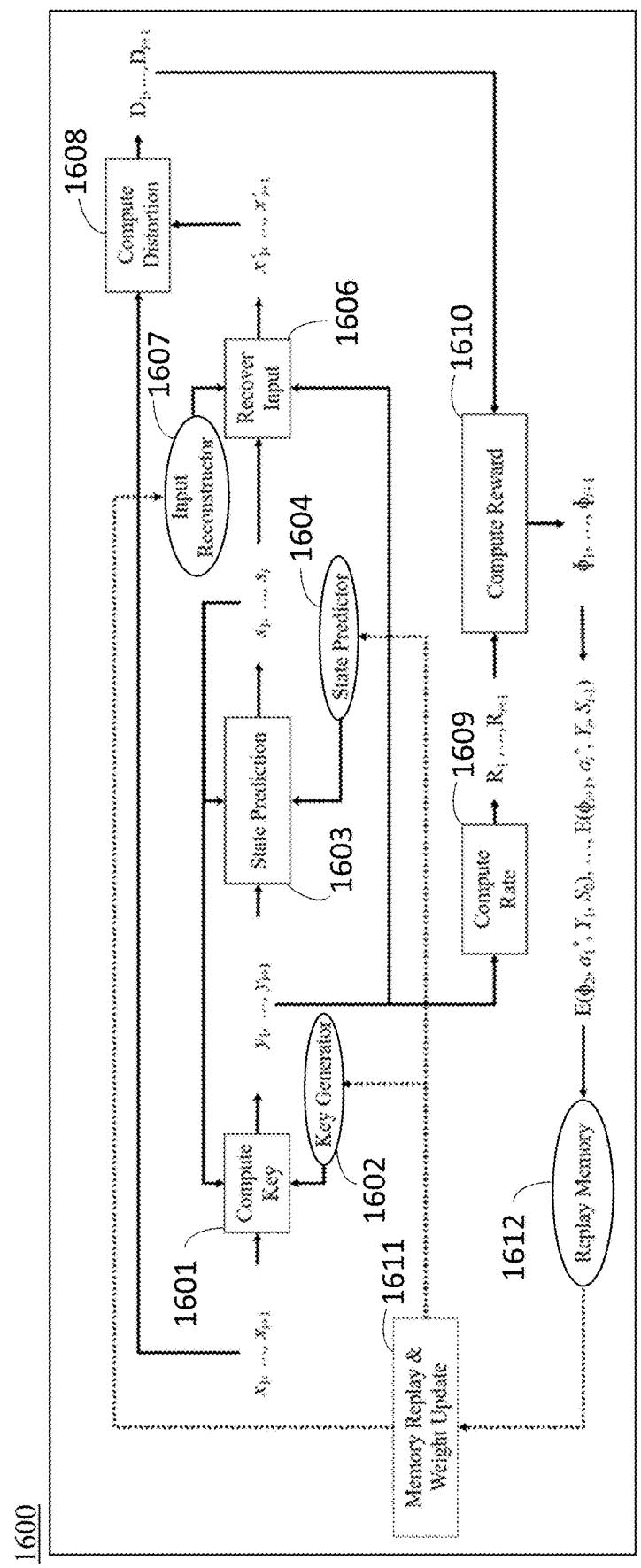
FIG. 16 a simplified illustration of a diagram in accordance with embodiments.
Figure 17:
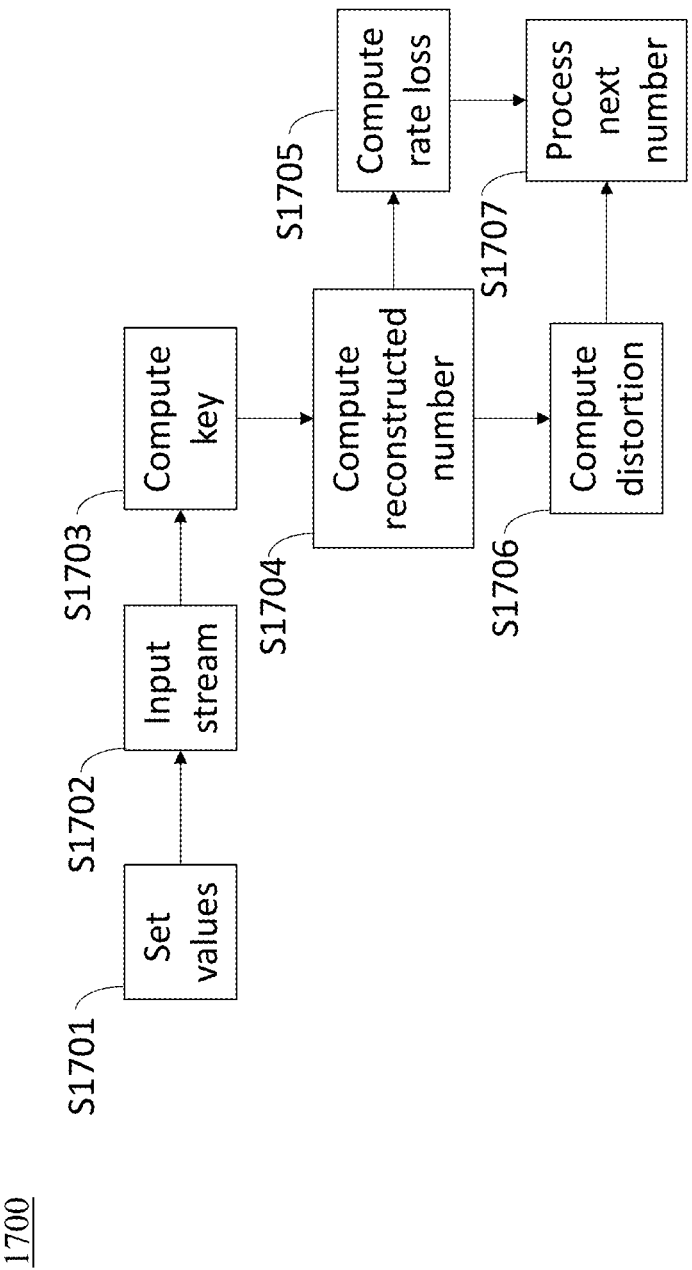
FIG. 17 a simplified illustration of a flowchart in accordance with embodiments.

According to exemplary embodiments, the diagram 1600 of FIG. 16 represents an exemplary workflow of a training stage along with the exemplary flowchart 1700 of FIG. 17 described below. For example, at S1701, let state($t_s$−1) be a current State Predictor, such as State Predictor 1604, let Key($t_k$−1) denote the current Key Generator, such as Key Generator 1602, and let Recon($t_r$−1) be the current Input Reconstructor, such as Input Reconstructor 1607; where $t_s$, $t_k$, and $t_r$ can be different, so that such State Predictor, the Key Generator and the Input Reconstructor can be updated at different times with different frequencies.

At S1702, given the training input stream $X=x_1, x_2, \ldots$, for each number $x_i$, the Compute Key module 1601, at S1703, computes the key $y_i$ based on $x_i$ by using the current Key Generator Key($t_k$–1). And same as the test stage, the inputs of the State Prediction module 1603 include the number of m previous keys $y_{i-(m-1)}, \ldots, y_i$ (m≥1) and n previous DQ states $s_{i-n}, \ldots, s_{i-1}$ (n≥1), based on which the State Prediction module 1603 computes the DQ state s, using the current State Predictor State($t_s$–1). Then the Recover Input module 1606, at S1704, computes the reconstructed number $x_i'$ based on key $y_i$ and DQ state $s_i$, by using the current Input Reconstructor Recon($t_r$–1). At S1706, a distortion $D_i$ can be computed in a Compute Distortion module 1608 to measure the difference between the original inputs $x_1, \ldots, x_i$ and the reconstructed numbers $x_1', \ldots, x_i'$ previous to the number $x_i$; where, for example, $D_i$ can be the average of the $L_k$-norm, e.g., $L_1$-norm as Mean Absolute Error and $L_2$-norm as Mean Square Error, of the difference between the corresponding elements in the stream:

$$D_i = avg_{l=1}^{i} \|x_l - x_l'\|^k \quad \text{(Eq. 1)}$$

At the same time, at S1705, a rate loss $R_i$ can be computed in a Compute Rate module 1609 to measure the bit consumption of the keys $y_1, \ldots, y_i$ previous to $y_i$; where, for example, $y_1, \ldots, y_i$ can be compressed using any entropy coding method and $R_i$ is the bit count of compressed bitstream. Then, at S707, the system goes on to process the next number $x_{i+1}$.

Figure 18:
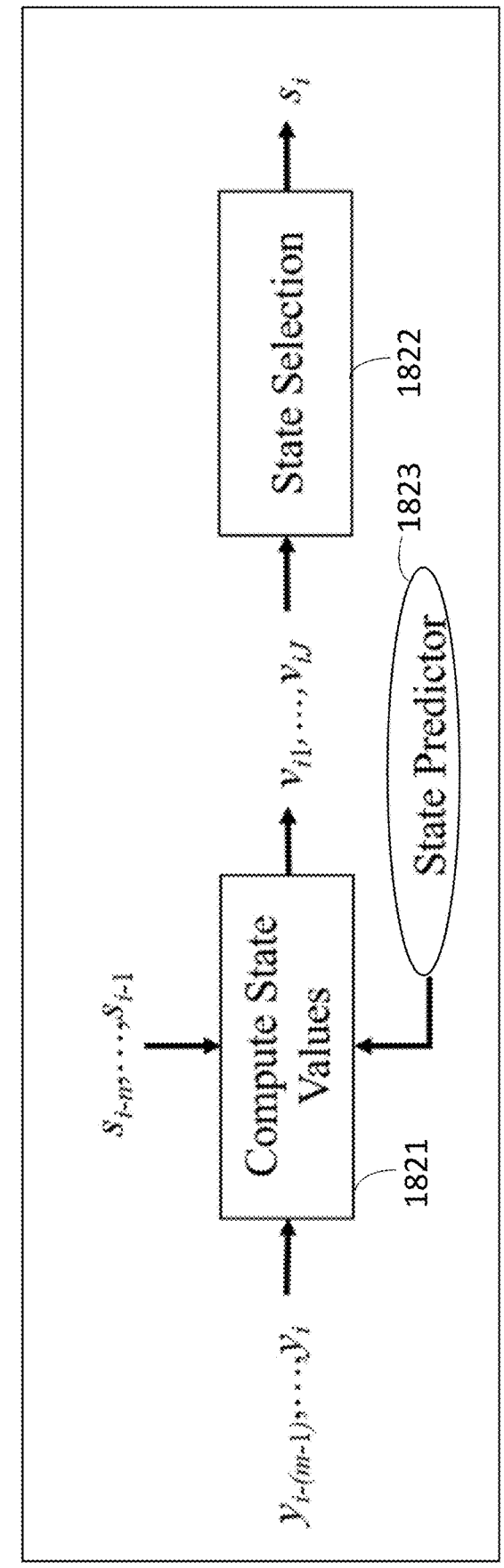
FIG. 18 a simplified illustration of a diagram in accordance with embodiments.
Figure 19:
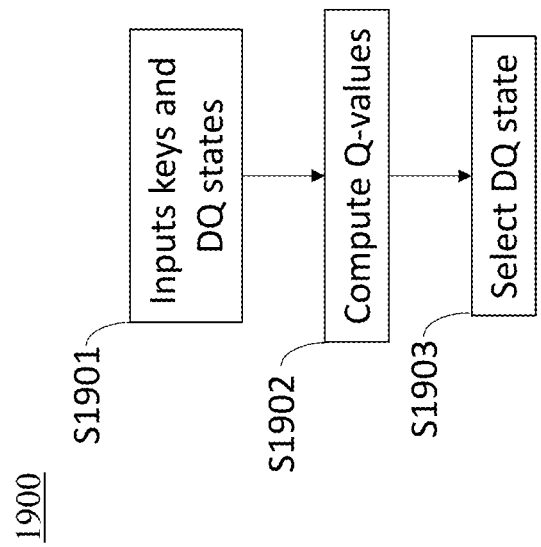
FIG. 19 a simplified illustration of a flowchart in accordance with embodiments.
Figure 20:
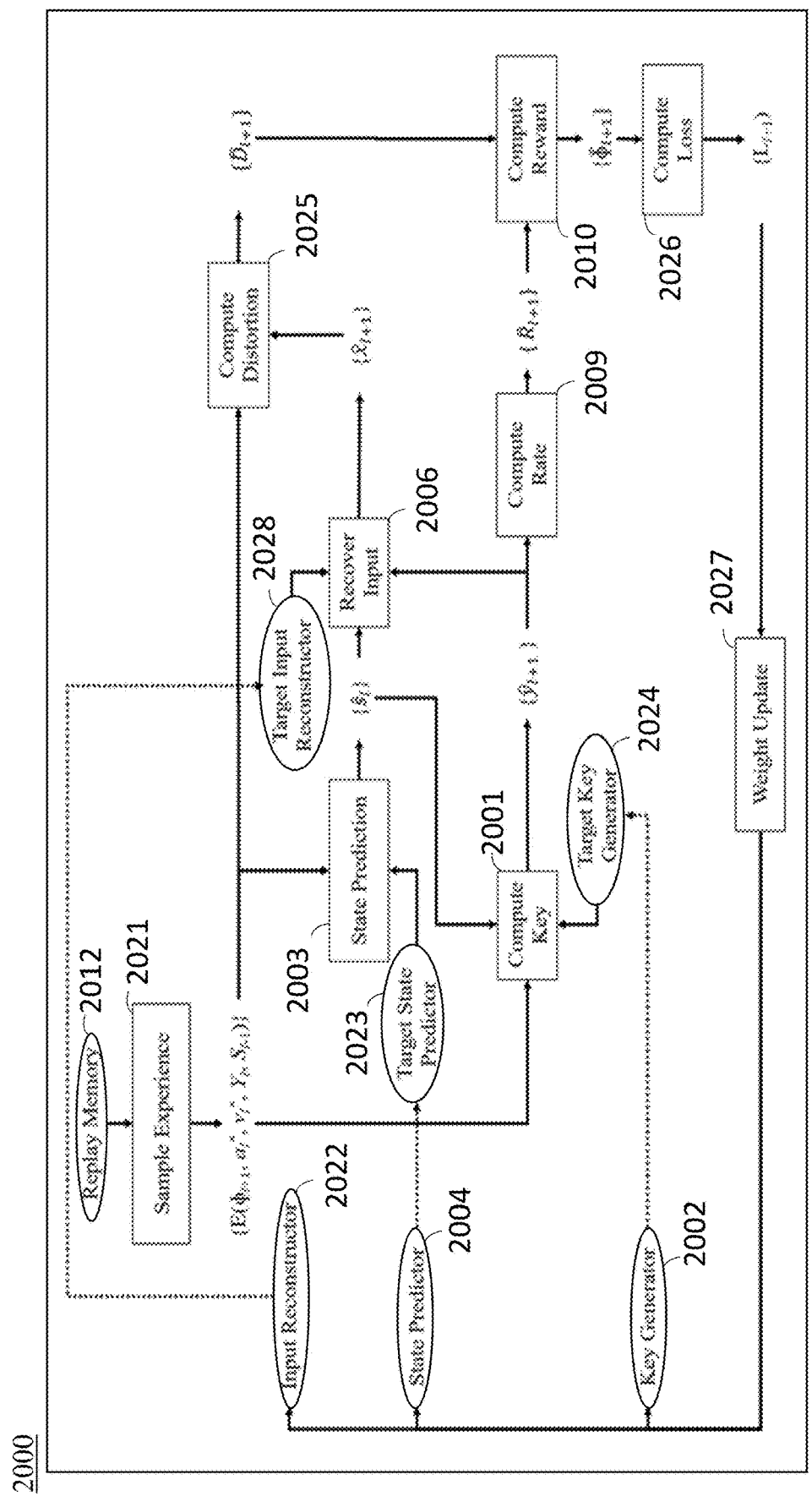
FIG. 20 a simplified illustration of a diagram in accordance with embodiments.

The exemplary diagram 1803 of FIG. 18, and associated flowchart 1900 of FIG. 19, represent details of the State Prediction module, such State Prediction module 1603 in FIG. 16 and similarly State Prediction module 2003 of FIG. 20 according to exemplary embodiments. For example, at S1901, given the m keys $Y_i = y_{i-(m-1)}, \ldots, y_i$ and n previous DQ states $S_{i-1} = s_{i-n}, \ldots, s_{i-1}$ as inputs, the State Predictor DNN State($t_s$–1) computes, at S1902, the Q-values $v_{ij}$ of all possible actions $a_{ij}$, j=1, ..., J in a Compute State Values module 1821. Then, at S1903, a State Selection module 1822, selects the DQ state s, using, for example, an ε-greedy method, where ε is a probability between 0 and 1; with probability ε, a random action $a_{ij}$ may be selected as the optimal action $a_i^*$, and with probability (1–ε), the optimal action $a_i^*$ may be selected. The DQ state corresponding to the optimal action $a_i^*$ is $s_i$. According to exemplary embodiments, for an adjacent pair of numbers $x_i$ and $x_{i+1}$, based on the distortion $D_i$ and $D_{i+1}$, and the rate loss $R_i$ and $R_{i+1}$, a reward $\Phi_{i+1}$ may be computed to measure the reward the State Predictor 1823 can get by taking the action $a_i^*$ given the current Q-inputs (keys $Y_i = y_{i-(m-1)}, \ldots, y_i$ and DQ states $S_{i-1} = s_{i-n}, \ldots, s_{i-1}$):

$$\phi_{i+1} = D_{i+1} + \lambda R_{i+1} \quad \text{(Eq. 2)}$$

where λ is a hyperparameter to balance the rate loss and distortion in the reward.

The experience $E(\Phi_{i+1}, a_i^*, v_i^*, Y_i, S_{i-1})$, i.e., selecting action $a_i^*$ with associated Q-value $v_i^*$ based on keys $Y_i$ and previous DQ states $S_{i-1}$ and then obtaining the reward $\Phi_{i+1}$, such as at Compute Reward module 1610, is added into a Replay Memory, such as any of Replay Memory 1612 in FIG. 16 and Replay Memory 2012 in FIG. 20 according to exemplary embodiment. Such Replay Memory usually has a maximum storage limit and once it reaches its limit, the oldest experience will be replaced by the latest one.

When it is time to update the State Predictor 1823, the Key Generator 1602, and the Input Reconstructor 1607, the system samples a batch of experiences from the Replay Memory 1612, and uses these sampled experiences to update the model parameters in the Memory Replay & Weight Update module 1611.

Figure 21:
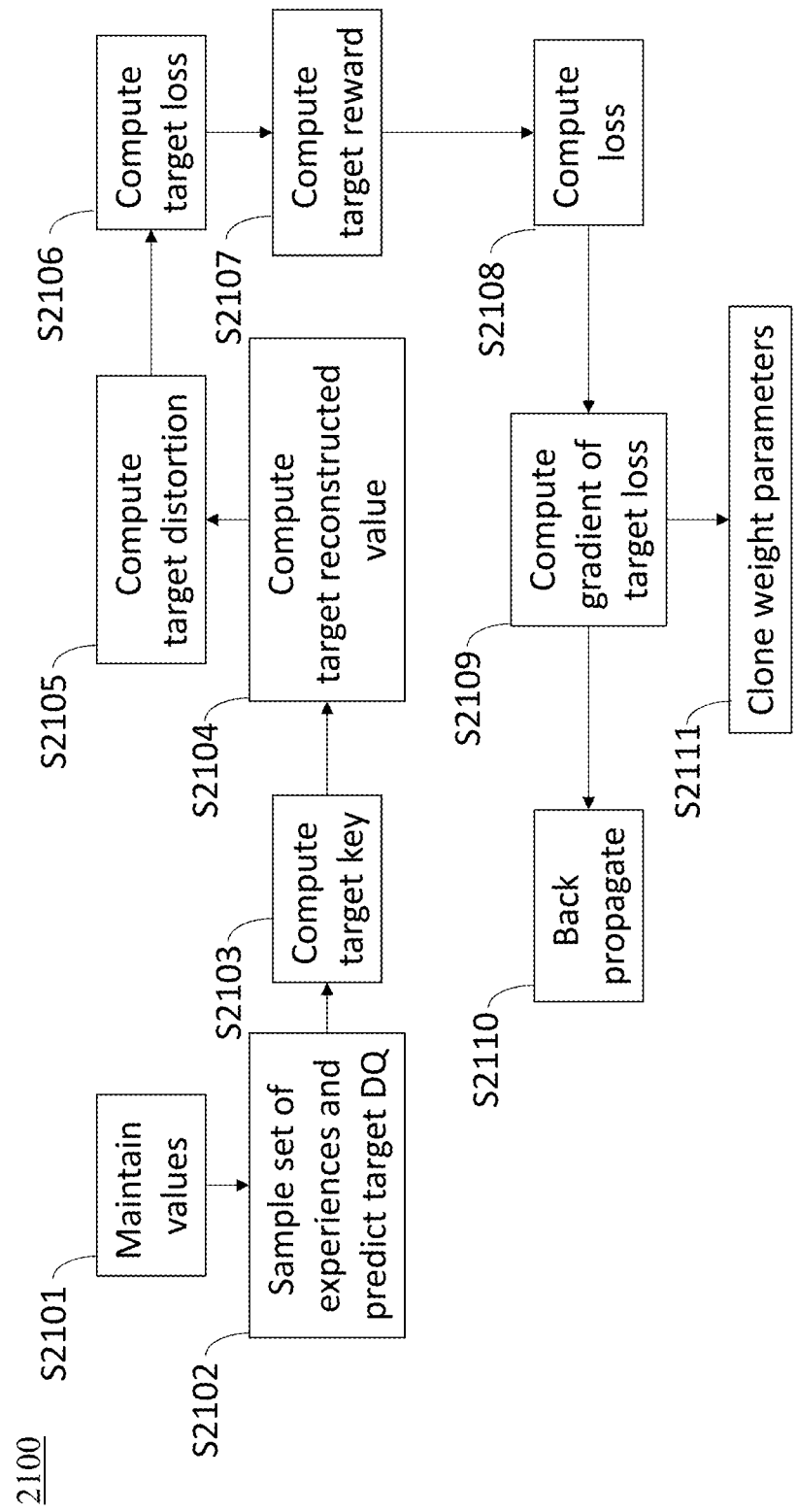
FIG. 21 a simplified illustration of a flowchart in accordance with embodiments.

The exemplary diagram 2000 of FIG. 20, and its associated flowchart 2100 of FIG. 21, gives an exemplary detailed workflow of the Memory Replay & Weight Update module 1611 described above. For example, during a training stage, processing may be implemented to maintain, at S2101, a Target State Predictor State$^T$, a Target Key Generator Key$^T$, and a Target Input Reconstructor Recon$^T$, having exactly the same DNN model structure as the State Predictor 2004, the Key Generator 2002, and the Input Reconstructor 2022, respectively. The only difference is the model parameters (i.e., the weight coefficients of the DNNs), which are cloned from the corresponding State Predictor 2004, Key Generator 2002 and Input Reconstructor 2022 at every $T_s$, $T_k$ and $T_r$ parameter updating cycles.

Specifically, during each parameter updating cycle, the system samples, at S2102, a set of experiences 2021 from the Replay Memory, such as Replay Memory 2012, $\{E(\Phi_{l+1}, a_l^*, v_l^*, Y_l, S_{l-1})\}$. For each experience $E(\Phi_{l+1}, a_l^*, v_l^*, Y_l, S_{l-1})$, of experiences 2021, in the State Prediction module 2003, the Target State Predictor, target state predictor 2023, State$^T$ predicts, at S2102, a target DQ state $\hat{s}_l$ based on the input keys $Y_l$ and DQ states $S_{l-1}$ in the experience. Based on the target DQ state $\hat{s}_l$, the Target Key Generator, target key generator 2024, Key$^T$ and compute key module 2001 computes, at S2003, a target key $\hat{y}_{l+1}$. Based on the target key $\hat{y}_{l+1}$ and the target DQ state $\hat{s}_l$, the Target Input Reconstructor, target input Reconstructor 2028, Recon$^T$ can compute, at S2104, a target reconstructed $\hat{x}_{l+1}$ in the Recover Input module 2006. Then the Compute Distortion module 2025 computes, at S2105, a target distortion $\hat{D}_{l+1}$ based on $\hat{x}_{l+1}$ and the original $x_{l+1}$ in the experience 2021, and the Compute Rate module 2009 computes, at S2106, a target rate loss $\hat{R}_{l+1}$ based on $\hat{y}_{l+1}$. The steps S2106 and S2107 may be implemented sequentially or in parallel according to exemplary embodiments. A target reward $\hat{\phi}_{l+1}$ can be computed, at S2107, based on $\hat{R}_{l+1}$ and $\hat{D}_{l+1}$ in the Compute Reward module 2010. After that, a Compute Loss module 2026, also at S2107, can also compute a target reward $T(a_l^*, Y_l, S_{l-1})$:

$$T(a_l^*, Y_l, S_{l-1}) = \hat{\phi}_{l+1} + \gamma \max_j \hat{Q}(a_{(l+1)j}, \hat{Y}_{l+1}, \hat{S}_l), \quad \text{(Eq. 3)}$$

where $\hat{Q}(a_{(l+1)j}, \hat{Y}_{l+1}, \hat{S}_l)$ is the Q-value predicted by the Target State Predictor State$^T$ for action $a_{(l+1)j}$ given the input keys $\hat{Y}_{l+1} = y_{l-(m-2)}, \ldots, \hat{y}_{l+1}$ and states $S_l = S_{l-1} = s_{l-(n-1)}, \ldots, \hat{s}_l$. The hyperparameter γ is the discount rate valued between 0 and 1, which determines how important the system weights long-term rewards against short-term ones. The smaller the discount rate, the system weights less on long-term rewards but cares only for the short-term rewards. Then computation of a target loss $L(a_{(l+1)j}, \hat{Y}_{l+1}, \hat{S}_l)$ may occur based on the target reward $T(a_l^*, Y_l, S_{l-1})$ and the original $v_l^*$ from the experience, e.g., the $L_k$-norm of the difference between these two rewards:

$$L(a_{(l+1)j}, \hat{Y}_{l+1}, \hat{S}_l) = \|T(a_l^*, Y_l, S_{l-1}) - v_l^*\|^k \qquad \text{(Eq. 4)}$$

Then, at S2109, the gradient of the target loss is computed, which is back-propagated to update, by weight update module 2027, the weight parameters of the DNNs of the State Predictor 2004 into State($t_s$), the Key Generator Key, key generator 2002, ($t_k$), and the Input Reconstructor, input Reconstructor 2022, Recon($t_r$). As mentioned before, the State Predictor 2004, the Key Generator 2002, and the Input Reconstructor 2022 can be updated at different time stamps here. That is, the gradient of the loss can be back-propagated, at S2110, to update each of the State Predictor 2004, the Key Generator 2002, and the Input Reconstructor 2022 individually.

Further, at S2111, for every $T_s$, $T_k$ and $T_r$ iterations of, for example flowchart 2100, the weight parameters of the State Predictor 2004, the Key Generator 2002, and the Input Reconstructor 2022 will be cloned to the Target State Predictor, target state predictor 2023, State$^T$, the Target Key Generator, target key generator 2024, Key$^T$, and the Target Input Reconstructor, target input Reconstructor 2028, Recon$^T$, respectively. Further, according to exemplary embodiments, using the Replay Memory 2012 and the Target State Predictor 2023, Target Key Generator 2024, and Target Input Reconstructor 2028 may stabilize the training process. Further, the Replay Memory 2012 can have only one latest experience, according to exemplary embodiments, which equals to not having a Replay Memory in some situations. Also, $T_s$, $T_k$ and $T_r$ can all equal to 1 so that the Target State Predictor 2023, Target Key Generator 2024, and Target Input Reconstructor 2028 will be updated for every iteration, which equals to not having another set of Target State Predictor 2023, Target Key Generator 2024, and Target Input Reconstructor 2028 according to exemplary embodiments.

Accordingly, viewing the above disclosure, there is presented embodiments including learning-based E2E DQ with DQN, which may support an arbitrary number of DQ states, and where transitions among different DQ states may be automatically determined based on the Deep Q-Network (DQN) algorithm, and as such, there is disclosed a flexible and general framework that accommodates different DNN structures of a State Predictor, a Key Generator, and an Input Reconstructor advantageously.

The techniques described above, can be implemented as computer software using computer-readable instructions and physically stored in one or more computer-readable media or by a specifically configured one or more hardware processors. For example, FIG. 22 shows a computer system 2200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
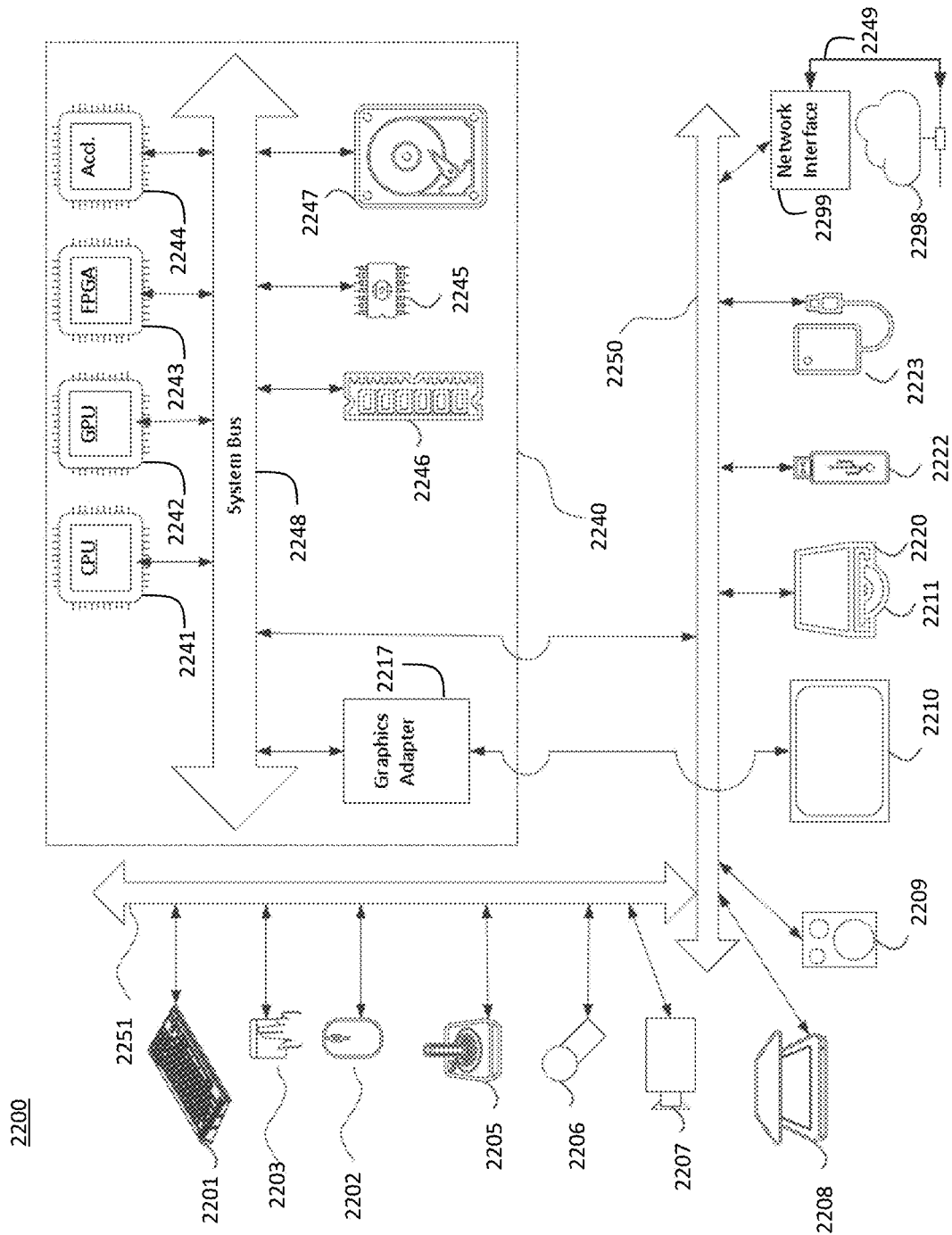
FIG. 22 a simplified illustration of a schematic diagram in accordance with embodiments.

The components shown in FIG. 22 for computer system 2200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2200.

Computer system 2200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2201, mouse 2202, trackpad 2203, touch screen 2210, joystick 2205, microphone 2206, scanner 2208, camera 2207.

Computer system 2200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2210, or joystick 2205, but there can also be tactile feedback devices that do not serve as input devices), audio output devices (such as: speakers 2209, headphones (not depicted)), visual output devices (such as screens 2210 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 2200 can also include human accessible storage devices and their associated media such as optical media including CD/DVD ROM/RW 2220 with CD/DVD 2211 or the like media, thumb-drive 2222, removable hard drive or solid state drive 2223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2200 can also include interface 2299 to one or more communication networks 2298. Networks 2298 can for example be wireless, wireline, optical. Networks 2298 can further be local, wide-area, metropolitan, vehicular and industrial, real-time, delay-tolerant, and so on. Examples of networks 2298 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 2298 commonly require external network interface adapters that attached to certain general-purpose data ports or peripheral buses (2250 and 2251) (such as, for example USB ports of the computer system 2200; others are commonly integrated into the core of the computer system 2200 by attachment to a system bus as described below (for example Ethernet interface into a PC computer system or cellular network interface into a smartphone computer system). Using any of these networks 2298, computer system 2200 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2240 of the computer system 2200.

The core 2240 can include one or more Central Processing Units (CPU) 2241, Graphics Processing Units (GPU) 2242, a graphics adapter 2217, specialized programmable processing units in the form of Field Programmable Gate Areas (FPGA) 2243, hardware accelerators for certain tasks 2244, and so forth. These devices, along with Read-only memory (ROM) 2245, Random-access memory 2246, internal mass storage such as internal non-user accessible hard drives, SSDs, and the like 2247, may be connected through a system bus 2248. In some computer systems, the system bus 2248 can be accessible in the form of one or more physical plugs to enable extensions by additional CPUs, GPU, and the like. The peripheral devices can be attached either directly to the core's system bus 2248, or through a peripheral bus 2251. Architectures for a peripheral bus include PCI, USB, and the like.

CPUs 2241, GPUs 2242, FPGAs 2243, and accelerators 2244 can execute certain instructions that, in combination, can make up the aforementioned computer code. That computer code can be stored in ROM 2245 or RAM 2246. Transitional data can be also be stored in RAM 2246, whereas permanent data can be stored for example, in the internal mass storage 2247. Fast storage and retrieval to any of the memory devices can be enabled through the use of cache memory, that can be closely associated with one or more CPU 2241, GPU 2242, mass storage 2247, ROM 2245, RAM 2246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2200, and specifically the core 2240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 2240 that are of non-transitory nature, such as core-internal mass storage 2247 or ROM 2245. The software implementing various embodiments of the present disclosure can be stored in such devices and executed by core 2240. A computer-readable medium can include one or more memory devices or chips, according to particular needs. The software can cause the core 2240 and specifically the processors therein (including CPU, GPU, FPGA, and the like) to execute particular processes or particular parts of particular processes described herein, including defining data structures stored in RAM 2246 and modifying such data structures according to the processes defined by the software. In addition or as an alternative, the computer system can provide functionality as a result of logic hardwired or otherwise embodied in a circuit (for example: accelerator 2244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video coding performed by at least one processor, the method comprising:
   obtaining an input stream of video data;
   computing a key based on a floating number in the input stream;
   predicting a current dependent quantization (DQ) state based on a state predictor and a number of previous keys and a number of previous DQ states;
   reconstructing the floating number based on the key and the current DQ state; and
   coding the video based on the reconstructed floating number.

2. The method according to claim 1,
   wherein computing the key and reconstructing the floating number comprises implementing one or more deep neural networks (DNN).

3. The method according to claim 1,
   wherein the state predictor comprises an action-value mapping function between an action and an output Q-value associated with the action.

4. The method according to claim 3, further comprising:
   computing a plurality of keys, including the key, based on a plurality of floating numbers, including the floating number, in the input stream; and
   reconstructing the plurality of floating numbers based on the plurality of keys and at least the current DQ state.

5. The method according to claim 3,
   wherein the action corresponds to at least one of the DQ states.

6. The method according to claim 5, further comprising:
   wherein the state predictor further comprises respective correspondences between ones of a plurality of actions, including the action, and ones of the DQ states, including the at least one of the DQ states.

7. The method according to claim 1,
   wherein predicting the current DQ state comprises implementing an action-value mapping function between an action and an output Q-value associated with the action the previous keys and the previous DQ states.

8. The method according to claim 1,
wherein the state predictor comprises an action-value mapping function between an action and an output Q-value associated with the action, and
wherein the output Q-value represents a measurement of a target quantization performance associated with a sequence of actions, including the action.

9. The method according to claim 1,
wherein predicting the current DQ state based on the state predictor comprises computing Q-values, including the output Q-value, for each of the actions.

10. The method according to claim 1,
wherein the output Q-value is selected from among the computed Q-values.

11. An apparatus for video coding performed by at least one processor, the apparatus comprising:
at least one memory configured to store computer program code;
at least one processor configured to access the computer program code and operate as instructed by the computer program code, the computer program code including:
obtaining code configured to cause the at least one processor to obtain an input stream of video data;
computing code configured to cause the at least one processor to compute a key based on a floating number in the input stream;
predicting code configured to cause the at least one processor to predict a current dependent quantization (DQ) state based on a state predictor and a number of previous keys and a number of previous DQ states;
reconstructing code configured to cause the at least one processor to reconstruct the floating number based on the key and the current DQ state; and
coding code configured to cause the at least one processor to code the video based on the reconstructed floating number.

12. The apparatus according to claim 11,
wherein computing the key and reconstructing the floating number comprises implementing one or more deep neural networks (DNN).

13. The apparatus according to claim 11,
wherein the state predictor comprises an action-value mapping function between an action and an output Q-value associated with the action.

14. The apparatus according to claim 13,
wherein the computing code is further configured to cause the at least one processor to compute a plurality of keys, including the key, based on a plurality of floating numbers, including the floating number, in the input stream; and
wherein the reconstructing code is further configured to cause the at least one processor to reconstruct the plurality of floating numbers based on the plurality of keys and at least the current DQ state.

15. The apparatus according to claim 14,
wherein the action corresponds to at least one of the DQ states.

16. The apparatus according to claim 15, wherein the state predictor further comprises respective correspondences between ones of a plurality of actions, including the actions, and ones of the DQ states, including the at least one of the DQ states.

17. The apparatus according to claim 1,
wherein predicting the current DQ state comprises implementing an action-value mapping function between an action and an output Q-value associated with the action the previous keys and the previous DQ states.

18. The apparatus according to claim 1,
wherein the state predictor comprises an action-value mapping function between an action and an output Q-value associated with the action, and
wherein the output Q-value represents a measurement of a target quantization performance associated with a sequence of actions, including the action.

19. The apparatus according to claim 1,
wherein predicting the current DQ state based on the state predictor comprises computing Q-values, including the output Q-value, for each of the actions, and
wherein the output Q-value is selected from among the computed Q-values.

20. A non-transitory computer readable medium storing a program causing a computer to execute a process, the process comprising:
obtaining an input stream of video data;
computing a key based on a floating number in the input stream;
predicting a current dependent quantization (DQ) state based on a state predictor and a number of previous keys and a number of previous DQ states;
reconstructing the floating number based on the key and the current DQ state; and
coding the video based on the reconstructed floating number.

* * * * *